3,067,237
LOWER-ALKYL MONO- OR BIS-(ALKANESULFON-
AMIDO) BENZOATE ESTERS
Aubrey A. Larsen, Schodack, N.Y., assignor to Sterling
Drug Inc., New York, N.Y., a corporation of Delaware
No Drawing. Original application Apr. 14, 1959, Ser.
No. 806,235. Divided and this application Mar. 29,
1960, Ser. No. 23,344
4 Claims. (Cl. 260—470)

This invention relates to new lower-alkyl mono- or bis-(alkanesulfonamido)benzoate esters useful as intermediates in the preparation of new 1-[mono- and bis(alkanesulfonamido)benzoyl]hydrazines, 1-[mono- and bis(alkanesulfonamido) benzoyl] - 2 - lower - acylhydrazines, of Formula I as hereinafter shown.

A preferred aspect of the invention relates to compounds having the formula:

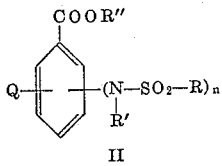

II wherein R represents an alkyl radical, R' represents a hydrogen atom or a lower-alkyl radical, Q represents a hydrogen atom or from one to two radicals selected from the group consisting of lower-alkyl, halogen (including fluorine, chlorine, bromine or iodine), hydroxy, lower-alkoxy, nitro, amino, lower-acylamino, lower-acyl, lower-acyloxy, cyano, lower-alkylmercapto, lower-alkylsulfinyl and lower-alkylsulfonyl radicals, R" represents a lower-alkyl group containing from one to about four carbon atoms, and $n$ represents the integers 1 or 2. When two alkanesulfonamido groups are present, as is the case when $n$ is 2, R can either represent the same or two different alkane radicals and R' can represent either the same or two different lower-alkyl radicals or one R' can be hydrogen and the other a lower-alkyl radical. When Q represents two of the above-named radicals, they can be the same or different and can occupy any of the available positions on the benzene nucleus.

In the above general Formula II, R represents an alkyl radical. It can contain from one to about twenty carbon atoms and can be either straight or branched. Thus R includes such groups, inter alia, as methyl, ethyl, n-propyl, isopropyl, n-butyl, t-butyl, pentyl, hexyl, heptyl, octyl, decyl, dodecyl and eicosyl.

In the above general formula II, R' represents a hydrogen atom or a lower-alkyl radical. The lower-alkyl radical can contain from one to about four carbon atoms and can be either straight or branched. R' thus includes such groups, inter alia, as methyl, ethyl, n-propyl, isopropyl, n-butyl and isobutyl.

The N(R')SO₂R group or groups in the above general Formula II can occupy any of the available positions in the benzene ring, although when $n$ is 2, it is preferred that these groups occupy the 3 and 5 positions with respect to the —COOR" group.

In the above general Formula II, Q represents a hydrogen atom, or a radical selected from the group consisting of lower-alkyl, halogen, hydroxy, lower-alkoxy, nitro, amino, lower-acylamino, lower-acyl, lower-acyloxy, cyano, lower-alkylmercapto, lower-alkylsulfinyl and lower-alkylsulfonyl radicals. When Q represents a lower-alkyl, lower-alkoxy, lower-acylamino, lower-acyl, lower-acyloxy, lower-alkylmercapto, lower-alkylsulfinyl or lower-alkylsulfonyl radical, the radicals can contain from one to about five carbon atoms and can be either straight or branched. Furthermore, when Q represents a lower-acylamino or lower-acyloxy radical, the lower-acyl moiety can be further substituted by one or more further substituents on the α-carbon atom such as halogen (for example chlorine or bromine) or cyano radicals. Thus Q includes such radicals, inter alia, as methoxy, 3-methylbutoxy, acetylamino, isobutyrylamino, acetyl, propionyl, acetoxy, propionoxy, methylmercapto, isopropylmercapto, methylsulfinyl, methylsulfonyl, isopropylsulfinyl, isopropylsulfonyl, α-chloroacetylamino, α-cyanoacetylamino, α-chloroacetoxy and α-cyanoacetoxy radicals.

The compounds of the invention are used as intermediates in the preparation of 1-[mono- and bis(alkanesulfonamido)benzoyl]hydrazines and 1-[mono- and bis(alkanesulfonamido)benzoyl]-2-lower-acylhydrazines having the formula:

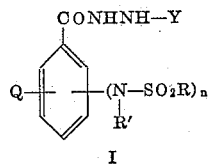

I wherein R, R', Q and $n$ have the meanings given above and Y represents a hydrogen atom or a lower-acyl radical. The latter have been found to possess bactericidal activity against such organisms as *Staphylococcus aureus*, *Eberthella typhi*, *Pseudomonas aeruginosa*, *Diplococcus pneumoniae*, *Clostridium welcheii*, *Mycobacterium tuberculosis*, and the like; and amoebicidal activity against *Endamoeba criceti*. The compounds of Formula I are prepared by reacting a lower-alkyl mono- or bis(alkanesulfonamido)benzoate ester of Formula II with hydrazine hydrate at a temperature between about 40° C. and about 200° C. Although it is preferred to use 100% hydrazine hydrate, any commercially available grade of aqueous hydrazine hydrate such as an 85% aqueous solution can also be used. The reaction can be carried out in the absence of any solvent or, if desired, it may be conducted in an organic solvent inert under the conditions of the reaction. Suitable solvents for the purpose are methanol, ethanol, 2-propanol, ethylene glycol, diethylene glycol and the like.

The compounds of Formula I wherein R' is a lower-alkyl radical are prepared by reacting a lower-alkyl mono- or bis(N-lower-alkylalkanesulfonamido)benzoate ester with hydrazine using the reaction conditions described above.

The compounds of Formula I wherein Y is a lower-acyl radical are prepared from the corresponding compounds wherein Y is H by reacting the latter with an acylating agent which, on reaction, provides an acyl radical containing from one to about five carbon atoms. A preferred method comprises reacting the 1-[mono- and bis(lower-alkanesulfonamido)benzoyl]hydrazines of Formula I with a member of the group consisting of lower-acyl anhydrides, lower-acyl halides and lower-acyl lower-alkyl carbonates at a temperature between about −10° C. and about 90° C. The reaction can be effected with or without the use of an acid-acceptor if desired. The purpose of the acid-acceptor is to take up the hydrogen halide produced when a lower-acyl halide is the acylating agent or the lower-alkanoic acid produced when a lower-acyl anhydride is the acylating agent. When a lower-acyl lower-alkyl carbonate is used as the acylating agent, no acid-acceptor is necessary since the by-products of the reaction, a lower-alkanol and carbon dioxide, are not acidic. Suitable acid-acceptors are pyridine, sodium carbonate, sodium acetate, triethylamine, sodium hydroxide and the like.

The compounds of Formula II, which are useful as intermediates in the preparation of compounds of Formula I, are prepared by reacting the corresponding lower-alkyl mono- or diaminobenzoate ester with an alkanesulfonyl halide. A preferred method comprises reacting the lower-alkyl aminobenzoate ester with the alkanesulfonyl halide at a temperature in the range from about 0° C. to about 100° C. and in the presence of an acid-acceptor. The reaction may be carried out without the use of a solvent or, if desired, in an organic solvent inert under the conditions of the reaction. Suitable solvents for the purpose are benzene, acetone, ethyl acetate, chloroform, ethylene dichloride and the like. The purpose of the acid-acceptor is to take up the hydrogen halide which is split out during the course of the reaction. The acid-acceptor is a basic substance which forms water-soluble by-products easily separable from the main product of the reaction, and includes such substances as pyridine, triethylamine, sodium hydroxide and the like. The acid-acceptor can also be in the form of an excess quantity of the lower-alkyl mono- or diaminobenzoate ester.

The compounds of Formula II wherein R' is lower-alkyl are prepared by reacting a lower-alkyl mono- or bis(alkanesulfonamido)benzoate ester in the presence of an acid-acceptor with a lower-alkylating agent, for example a lower-alkyl sulfate, a lower-alkyl halide or a lower-alkyl p-toluenesulfonate. Preferred lower-alkylating agents are lower-alkyl sulfates. When a lower-alkyl sulfate is used, the reaction is preferably carried out at a temperature in the range from about 0° C. to about 50° C. in an aqueous medium although water-miscible solvents such as methanol and ethanol can be used as well. The purpose of the acid-acceptor is to take up the lower-alkyl acid sulfate or the sulfuric acid produced in the reaction and includes such substances as sodium hydroxide, potassium hydroxide and the like.

In the compounds of Formula I, where two alkanesulfonamido groups are present, as is the case when $n$ is 2, R can either represent the same or two different alkane radicals and R' can represent either the same or two different lower-alkyl radicals or one R' can be hydrogen and the other a lower-alkyl radical. The 1-[bis(alkanesulfonamido)benzoyl]hydrazines where the two R and/or R' groups are different are prepared by reacting a lower-alkyl nitro-mono(lower-alkanesulfonamido)benzoate ester of Formula II (Q is $NO_2$; $n$ is 1) with a lower-alkylating agent, for example a lower-alkyl sulfate, as described above. The resulting lower-alkyl nitro-mono(N-lower-alkylalkanesulfonamido)benzoate esters are then reduced to the corresponding lower-alkyl amino-mono(N-lower-alkylalkanesulfonamido)benzoate esters using any of the conventional methods for the chemical reduction of an aromatic nitro group to the amino group, for example, iron and hydrochloric acid, tin and hydrochloric acid, zinc and aqueous alcohol, ferrous sulfate and ammonia or ammonium sulfide in aqueous alcohol.

The resulting lower-alkyl amino-mono(N-lower-alkylalkanesulfonamido)benzoate esters can then be reacted with an alkanesulfonyl halide as described above to introduce a second and, if desired, different alkanesulfonamido group. The resulting lower-alkyl alkanesulfonamido-(N-lower-alkylalkanesulfonamido)-benzoate esters can, if desired, be alkylated again with a second, different lower-alkylating agent thus producing the lower-alkyl bis(N - lower - alkylalkanesulfonamido)benzoate esters. Reaction of the latter with hydrazine as described above affords the 1-[bis(N'-lower-alkylalkanesulfonamido)benzoyl]hydrazines of Formula I where the two R and R' groups in the two alkanesulfonamido groups are different.

The above-described procedure can be used to prepare compounds of Formula I where $n$ is 2 and where the two R and R' groups in the two alkanesulfonamido groups are either the same or different. A second method for preparing the compounds where the alkanesulfonamido groups are the same comprises reducing a lower-alkyl dinitrobenzoate ester with hydrogen over a platinum or palladium-on-charcoal catalyst. The resulting lower-alkyl diaminobenzoate esters are then reacted with two molar equivalents of an alkanesulfonyl halide to produce the corresponding lower-alkyl bis(alkanesulfonamido)benzoate esters. The latter can either be reacted with two molar equivalents of a lower-alkylating agent to produce the lower-alkyl bis(N' - lower - alkylalkanesulfonamido)-benzoate esters or with hydrazine to produce compounds of Formula I wherein R' is H and $n$ is 2.

The structures of the compounds of the invention have been established by chemical analysis and by the processes for their preparation, which can only lead to compounds of the assigned structure.

The following examples will further illustrate the invention without the latter being limited thereto.

PREPARATION OF INTERMEDIATES

Example 1

Ethyl 2-methanesulfonamidobenzoate (II; R is $CH_3$, R' is H, R" is $C_2H_5$, $n$ is 1, Q is H).—Sixty-six grams (0.4 mole) of ethyl anthranilate were dissolved in a solution of 200 ml. of benzene and 50 ml. of pyridine. To the solution was added 34 ml. (52 g., 0.4 mole) of methanesulfonyl chloride over a ten minute period. The reaction mixture was cooled slightly and then warmed on a steam bath for several minutes. After cooling to 15° C., the insoluble material was filtered off and the filtrate taken to dryness. The residual solid was taken into 10% aqueous sodium hydroxide, the solution was filtered, and the filtrate was acidified with dilute hydrochloric acid. The precipitated solid was collected and air-dried giving 75 g. of crude product, M.P. 97°–98° C. (uncorr.). A 15 g. sample was recrystallized from 2-propanol to give 10 g. of ethyl 2-methanesulfonamidobenzoate, M.P. 93.5–95.7° C. (corr.).

Analysis.—Calcd. for $C_{10}H_{13}NO_4S$: N, 5.76; S, 13.17. Found: N, 5.65; S, 13.44.

Example 2

Ethyl 2-methanesulfonamido-4-nitrobenzoate (II; R is $CH_3$, R' is H, R" is $C_2H_5$, $n$ is 1, Q is 4-$NO_2$) was prepared from 71 g. (0.34 mole) of ethyl 2-amino-4-nitrobenzoate and 29 ml. (43 g., 0.41 mole) of methanesulfonyl chloride in 31 ml. of pyridine and 330 ml. of acetone according to the manipulative procedure described above in Example 1. The crude product was recrystallized twice from methanol to give 15 g. of ethyl 2-methanesulfonamido-4-nitrobenzoate, M.P. 153.5–156.3° C. (corr.).

Analysis.—Calcd. for $C_{10}H_{12}N_2O_6S$: N, 4.86; S, 11.12. Found: N, 4.91; S, 11.62.

Example 3

Ethyl 5-chloro-2-methanesulfonamidobenzoate (II; R is $CH_3$, R' is H, R" is $C_2H_5$, $n$ is 1, Q is 5-Cl) was prepared from 45 g. (0.225 mole) of ethyl 2-amino-5-chlorobenzoate and 30 ml. (44 g., 0.43 mole) of methanesulfonyl chloride in 50 ml. of pyridine and 200 ml. of benzene according to the manipulative procedure described above in Example 1. The crude product was re-esterified in absolute ethanol saturated with hydrogen chloride gas and recrystallized from ethanol and washed with dilute sodium bicarbonate solution to give 9 g. of ethyl 5-chloro-2-methanesulfonamidobenzoate, M.P. 109.4–111.0° C. (corr.).

Analysis.—Calcd. for $C_{10}H_{12}ClNO_4S$: N, 5.04; S, 11.54. Found: N, 5.15; S, 11.60.

Example 4

Ethyl 2-butanesulfonamidobenzoate (II; R is $$CH_3(CH_2)_3$$

R' is H, R" is $C_2H_5$, $n$ is 1, Q is H) was prepared from 72.5 g. (0.44 mole) of ethyl anthranilate and 31 ml. (36 g., 0.23 mole) of butanesulfonyl chloride according to the manipulative procedure described above in Example 1. The product was purified by dissolving it in dilute sodium hydroxide and reprecipitating it by acidification with dilute hydrochloric acid. There was thus obtained 8 g. of ethyl 2-butanesulfonamidobenzoate, M.P. 35.5–40.1° C. (corr.).

*Analysis.*—Calcd. for $C_{13}H_{19}NO_4S$: N, 4.91; S, 11.50. Found: N, 4.92; S, 11.24.

Example 5

Ethyl 3-methanesulfonamidobenzoate (II; R is $CH_3$, R' is H, R'' is $C_2H_5$, n is 1, Q is H) was prepared from 65 g. (0.39 mole) of ethyl 3-aminobenzoate and 35 ml. (52 g., 0.45 mole) of methanesulfonyl chloride in 50 ml. of pyridine and 200 ml. of benzene according to the manipulative procedure described above in Example 1. The crude product was purified by precipitation from an acidified solution in dilute alkali giving 49 g. of product. A 20 g. sample was recrystallized from 2-propanol to give 18 g. of ethyl 3-methanesulfonamidobenzoate, M.P. 118–119° C. (uncorr.).

*Analysis.*—Calcd. for $C_{10}H_{13}NO_4S$: N, 5.76; S, 13.18. Found: N, 5.83; S, 12.74.

Example 6

Ethyl 3-methanesulfonamido-5-nitrobenzoate (II; R is $CH_3$, R' is H, R'' is $C_2H_5$, n is 1, Q is 5-$NO_2$) was prepared from 67 g. (0.32 mole) of ethyl 3-amino-5-nitrobenzoate and 27 ml. (40 g., 0.35 mole) of methanesulfonyl chloride in 28 ml. of pyridine and 300 ml. of acetone according to the manipulative procedure described above in Example 1. The product was recrystallized from methanol to give 10 g. of ethyl 3-methanesulfonamido-5-nitrobenzoate, M.P. 177.9–178.7° C. (corr.).

*Analysis.*—Calcd. for $C_{10}H_{12}N_2O_6S$: N.E. (Neutral Equivalent), 288; N, 4.86. Found: N.E., 287; N, 4.88.

Example 7

Ethyl 3-butanesulfonamidobenzoate (II; R is

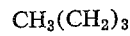

$CH_3(CH_2)_3$

R' is H, R'' is $C_2H_5$, n is 1, Q is H) was prepared from 63 g. (0.38 mole) of ethyl 3-aminobenzoate and 48 ml. (55.7 g., 0.37 mole) of butanesulfonyl chloride in 50 ml. of pyridine and 200 ml. of benzene according to the manipulative procedure described above in Example 1. The crude product was recrystallized from methanol to give 60 g. of ethyl 3-butanesulfonamidobenzoate, M.P. 52–56° C. (corr.).

Example 8

Ethyl 3-butanesulfonamido-5-nitrobenzoate (II; R is $CH_3(CH_2)_3$, R' is H, R'' is $C_2H_5$, n is 1, Q is 5-$NO_2$) was prepared from 20.8 g. (0.1 mole) of ethyl 3-amino-5-nitrobenzoate and 15 ml. (17.4 g., 0.11 mole) of butanesulfonyl chloride in 8.9 ml. of pyridine and 100 ml. of acetone according to the manipulative procedure described above in Example 1. The crude product was recrystallized from ethanol giving 6 g. of ethyl 3-butanesulfonamido-5-nitrobenzoate, M.P. 147–155.5° C. (corr.).

*Analysis.*—Calcd. for $C_{13}H_{18}N_2O_6S$: N, 8.47; S, 9.70. Found: N, 8.74; S, 9.81.

Example 9

Ethyl 3-acetoxy-5-butanesulfonamidobenzoate (II; R is $CH(CH_2)_3$, R' is H, R'' is $C_2H_5$, n is 1, Q is 3-$CH_3COO$) was prepared by dissolving 25.2 g. (0.1 mole) of ethyl 3-acetoxy-5-nitrobenzoate in 150 ml. of ethyl acetate and reducing over a platinum catalyst under fifty pounds of hydrogen. When reduction was complete, the catalyst was removed by filtration. The filtrate was added to a cold solution of 17.3 g. (0.11 mole) of butanesulfonyl chloride and 25 ml. of pyridine. The mixture was allowed to stand in a refrigerator for about fifteen hours and at room temperature for forty-eight hours. The reaction mixture was concentrated to a small volume and the residue poured into water. The precipitated solid was collected, dried and recrystallized twice from 2-propanol giving 14.5 g. of ethyl 3-acetoxy-5-sulfonamidobenzoate, M.P. 119.0–120.8° C. (corr.).

*Analysis.*—Calcd. for $C_{15}H_{21}NO_6S$: N, 4.08; S, 9.34. Found: N, 4.08; S, 9.19.

Example 10

Methyl 2-acetoxy-5-butanesulfonamidobenzoate (II; R is $CH_3(CH_2)_3$, R' is H, R'' is $CH_3$, n is 1, Q is 2-$CH_3COO$) was prepared from 23.9 g. (0.1 mole) of methyl 2-acetoxy-5-nitrobenzoate in 150 ml. of ethyl acetate and 17.3 g. (0.11 mole) of butanesulfonyl chloride in 25 ml. of pyridine according to the manipulative procedure described above in Example 9. The product was recrystallized from benzene giving 14 g. of methyl 2-acetoxy-5-butanesulfonamidobenzoate, M.P. 82.8–84.8° C. (corr.).

*Analysis.*—Calcd. for $C_{14}H_{19}NO_6S$: N, 4.25; S, 9.73. Found: N, 4.22; S, 9.77.

Example 11

Ethyl 4-methanesulfonamidobenzoate (II; R is $CH_3$, R' is H, R'' is $C_2H_5$, n is 1, Q is H) was prepared from 165 g. (1.0 mole) of ethyl 4-aminobenzoate and 57.3 g. (0.5 mole) of methanesulfonyl chloride in 500 ml. of benzene according to the manipulative procedure described above in Example 1. The crude product was recrystallized from 2-propanol giving 49.6 g. of ethyl 4-methanesulfonamidobenzoate, M.P. 129.8–131.7° C. (corr.).

*Analysis.*—Calcd. for $C_{10}H_{13}NO_4S$: N, 5.76; S, 13.18. Found: N, 5.82; S, 12.80.

Example 12

Ethyl 4-ethanesulfonamidobenzoate (II; R is $C_2H_5$, R' is H, R'' is $C_2H_5$, n is 1, Q is H) was prepared from 16.5 g. (0.1 mole) of ethyl 4-aminobenzoate and 14.3 g. (0.11 mole) of ethanesulfonyl chloride in 125 ml. of pyridine according to the manipulative procedure described above in Example 1. The crude product was recrystallized from 2-propanol giving 18.5 g. of ethyl 4-ethanesulfonamidobenzoate, M.P. 157–159° C. (uncorr.).

Example 13

Ethyl 4-propanesulfonamidobenzoate (II; R is

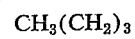

$CH_3(CH_2)_3$

R' is H, R'' is $C_2H_5$, n is 1, Q is H) was prepared from 23.1 g. (0.4 mole) of ethyl 4-aminobenzoate and 21.4 g. (0.15 mole) of propanesulfonyl chloride in 125 ml. of pyridine according to the manipulative procedure described above in Example 1. The crude product was purified by dissolving it in dilute sodium hydroxide and reprecipitating by acidifying with dilute hydrochloric acid. There was thus obtained 36 g. of ethyl 4-propanesulfonamidobenzoate, M.P. 122–127.5° C. (uncorr.).

Example 14

Ethyl 4-(2-propanesulfonamido)benzoate (II; R is $(CH_3)_2CH$, R' is H, R'' is $C_2H_5$, n is 1, Q is H) was prepared from 28.2 g. (0.17 mole) of ethyl 4-aminobenzoate and 24.3 g. (0.17 mole) of 2-propanesulfonyl chloride in 110 ml. of pyridine according to the manipulative procedure described above in Example 1. The product was recrystallized from ethanol giving 9.0 g. of ethyl 4-(2-propanesulfonamido)benzoate, M.P. 145–147° C. (uncorr.).

Example 15

Ethyl 4-butanesulfonamidobenzoate (II; R is

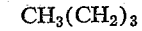

$CH_3(CH_2)_3$

R' is H, R'' is $C_2H_5$, n is 1, Q is H) was prepared from 74 g. (0.45 mole) of ethyl 4-aminobenzoate and 70 g. (0.45 mole) of butanesulfonyl chloride in 50 ml. of pyridine and 350 ml. of benzene according to the manipulative procedure described above in Example 1. The product was recrystallized from methanol giving 32 g. of ethyl 4-butanesulfonamidobenzoate, M.P. 78.9–87° C. (corr.).

*Analysis.*—Calcd. for $C_{13}H_{19}NO_4S$: N, 4.91; S, 11.24. Found: N, 5.01; S. 11.10.

Example 16

*Methyl 4-butanesulfonamido-2-chlorobenzoate* (II; R is $CH_3(CH_2)_3$, R' is H, R" is $CH_3$, n is 1, Q is 2-Cl) was prepared from 20 g. (0.108 mole) of methyl 4-amino-2-chlorobenzoate and 19.5 g. (0.124 mole) of butanesulfonyl chloride in 150 ml. of pyridine according to the manipulative procedure described above in Example 1. The product was recrystallized once from a benzene-ligroin (Skelly B) mixture and once from methanol to give 18.5 g. of methyl 4-butanesulfonamido-2-chlorobenzoate, M.P. 75.6—78.4° C. (corr.).

*Analysis.*—Calcd. for $C_{12}H_{16}ClNO_4S$: N, 4.58, S, 10.48. Found: N, 4.50; S, 10.46.

Example 17

*Ethyl 2-acetoxy-4-butanesulfonamidobenzoate* (II; R is $CH_3(CH_2)_3$, R' is H, R" is $C_2H_5$, n is 1, Q is 2-$CH_3COO$) was prepared from 25.4 g. (0.1 mole) of ethyl 2-acetoxy-4-nitrobenzoate in 120 ml. of ethyl acetate and 17.5 g. (0.11 mole) of butanesulfonyl chloride in 125 ml. of pyridine according to the manipulative procedure described above in Example 9. The product was recrystallized from methanol to give 24.5 g. of ethyl 2-acetoxy-4-butanesulfonamidobenzoate, M.P. 85–87° C. (uncorr.).

Example 18

*Ethyl 4-butanesulfonamido-2-methoxybenzoate* (II; R is $CH_3(CH_2)_3$, R' is H. R" is $C_2H_5$, n is 1, Q is 2-$CH_3O$) was prepared from 7.5 g. (0.038 mole) of ethyl 4-amino-2-methoxybenzoate and 13.5 g. (0.08 mole) of butanesulfonyl chloride in 125 ml. of pyridine according to the manipulative procedure described above in Example 1. The crude product was purified by dissolving it in aqueous sodium hydroxide and reprecipitating it by acidifying with dilute hydrochloric acid. There was thus obtained 9.6 g. of ethyl 4-butanesulfonamido-2-methoxybenzoate, M.P. 103–105° C. (uncorr.).

Example 19

*Methyl 4-butanesulfonamido-3-hydroxybenzoate* (II; R is $CH_3(CH_2)_3$, R' is H, R" is $CH_3$, n is 1, Q is 3-HO) was prepared from 13 g. (0.066 mole) of methyl 3-hydroxy-4-nitrobenzoate in 250 ml. of ethyl acetate and 9.5 g. (0.061 mole) of butanesulfonyl chloride in 25 ml. of pyridine according to the manipulative procedure described above in Example 9. The product was purified by dissolving in dilute aqueous sodium hydroxide and reprecipitating it by acidifying with dilute hydrochloric acid. There was thus obtained 10.3 g. of methyl 4-butanesulfonamido-3-hydroxybenzoate, M.P. 124–128° C. (uncorr.).

*Analysis.*—Calcd. for $C_{12}H_{17}NO_5S$: S, 11.19. Found: S, 10.90.

Example 20

*Ethyl 4-pentanesulfonamidobenzoate* (II; R is $$CH_3(CH_2)_4$$

R' is H, R" is $C_2H_5$, n is 1, Q is H) was prepared from 16.5 g. (0.1 mole) of ethyl 4-aminobenzoate and 18.8 g. (0.11 mole) of pentanesulfonyl chloride in 100 ml. of pyridine according to the manipulative procedure described above in Example 1. The crude product was recrystallized from dilute methanol giving 21.1 g. of ethyl 4-pentanesulfonamidobenzoate, M.P. 78–83° C. (uncorr.).

Example 21

*Ethyl 4-hexanesulfonamidobenzoate* (II; R is $CH_3(CH_2)_5$, R' is H, R" is $C_2H_5$, n is 1, Q is H) was prepared from 8.3 g. (0.05 mole) of ethyl 4-aminobenzoate and 10.4 g. (0.056 mole) of hexanesulfonyl chloride in 75 ml. of pyridine according to the manipulative procedure described above in Example 1. The crude product was recrystallized from dilute methanol to give 12.4 g. of ethyl 4-hexanesulfonamidobenzoate, M.P. 65–70° C. (uncorr.).

Example 22

*Ethyl 4-heptanesulfonamidobenzoate* (II; R is $CH_3(CH_2)_6$, R' is H, R" is $C_2H_5$, n is 1, Q is H) was prepared from 15.8 g. (0.096 mole) of ethyl 4-aminobenzoate and 21.0 g. (0.107 mole) of heptanesulfonyl chloride in 125 ml. of pyridine. The crude product was purified by dissolving it in dilute aqueous sodium hydroxide and reprecipitating it by acidifying with dilute hydrochloric acid. There was thus obtained 33.3 g. of ethyl 4-heptanesulfonamidobenzoate, M.P. 72.5–76° C. (uncorr.).

Example 23

*Ethyl 4-decanesulfonamidobenzoate* (II; R is $CH_3(CH_2)_9$, R' is H, R" is $C_2H_5$, n is 1, Q is H) was prepared from 5.3 g. (0.032 mole) of ethyl 4-aminobenzoate and 8.0 g. (0.033 mole) of decanesulfonyl chloride in 75 ml. of pyridine according to the manipulative procedure described above in Example 1. The crude product was recrystallized from methanol to give 6.7 g. of ethyl 4-decanesulfonamidobenzoate, M.P. 86–89° C. (uncorr.).

Example 24

*Methyl 4-acetyl-2-butanesulfonamidobenzoate* (II; R is $CH_3(CH_2)_3$, R' is H, R" is $CH_3$, n is 1, Q is 4-$CH_3CO$).— By reducing methyl 4-acetyl-2-nitrobenzoate [Mayer et al., Ber. 65B, 1333 (1932)] with hydrogen over a platinum catalyst according to the manipulative procedure described above in Example 9, and subsequent treatment of the methyl 4-acetyl-2-aminobenzoate produced with a molar equivalent amount of butanesulfonyl chloride and a molar excess of pyridine, there can be obtained methyl 4-acetyl-2-butanesulfonamidobenzoate.

Example 25

*Ethyl 3-butanesulfonamido-6-methylmercaptobenzoate* (II; R is $CH_3(CH_2)_3$, R' is H, R" is $CH_2H_5$, n is 1, Q is 6-$CH_3S$).—By treatment of ethyl 2-chloro-5-nitrobenzoate [Kenner et al., J. Chem. Soc. 119, 1053 (1921)] with methyl mercaptan in the presence of an acid-acceptor, there can be obtained ethyl 2-methylmercapto-5-nitrobenzoate which on treatment with ammonium sulfide in an appropriate organic solvent, for example ethanol, would afford ethyl 3-amino-6-methylmercaptobenzoate. On treatment of the latter with a molar equivalent amount of butanesulfonyl chloride in the presence of pyridine according to the manipulative procedure described above in Example 1, there can be obtained ethyl 3-butanesulfonamido-6-methylmercaptobenzoate.

Example 26

*Ethyl 3-butanesulfonamido-6-methylsulfinylbenzoate* (II; R is $CH_3(CH_2)_3$, R' is H, R" is $C_2H_5$, n is 1, Q is 6-$CH_3SO$).—By dissolving the ethyl 2-methylmercapto-5-nitrobenzoate obtained above in Example 25 in an appropriate organic solvent such as ethanol and treating the solution with one molar equivalent of peracetic acid (hydrogen peroxide dissolved in glacial acetic acid), there can be obtained ethyl 2-methylsulfinyl-5-nitrobenzoate which on reduction with ammonium sulfide in an appropriate organic solvent, for example ethanol, affords ethyl 3-amino-6-methylsulfinylbenzoate. On treatment of the latter compound with one molar euivalent amount of butanesulfonyl chloride in the presence of pyridine according to the manipulative procedure described above in Example 1, there can be obtained ethyl 3-butanesulfonamido-6-methylsulfinylbenzoate.

Example 27

*Ethyl 3-butanesulfonamido-6-methylsulfonylbenzoate* (II; R is $CH_3(CH_2)_3$, R' is H, R" is $C_2H_5$, n is 1, Q is 6-CH$_3$SO$_2$).—By dissolving the ethyl 2-methylmercapto-5-nitrobenzoate obtained above in Example 25 in an appropriate organic solvent such as ethanol and treating the solution with two molar equivalents of peracetic acid (hydrogen peroxide dissolved in glacial acetic acid), there can be obtained ethyl 2-methylsulfonyl-5-nitrobenzoate which on reduction with ammonium sulfide in an appropriate organic solvent, for example ethanol, affords ethyl 3-amino-6-methylsulfonylbenzoate. On treatment of the latter compound with one molar equivalent amount of butanesulfonyl chloride in the presence of pyridine according to the manipulative procedure described above in Example 1, there can be obtained ethyl 3-butanesulfonamido-6-methylsulfonylbenzoate.

Example 28

*Ethyl 3-butanesulfonamido-6-cyanobenzoate* (II; R is CH$_3$(CH$_2$)$_3$, R' is H, R" is C$_2$H$_5$, n is 1, Q is 6-CN).—By reacting ethyl 2-chloro-5-nitrobenzoate with sodium cyanide in an appropriate organic solvent such as ethanol, acetone or acetonitrile, and then adding a catalytic amount of sodium iodide to facilitate the reaction, there can be obtained ethyl 2-cyano-5-nitrobenzoate which on reduction with ammonium sulfide in an appropriate organic solvent, for example ethanol, would afford ethyl 3-amino-6-cyanobenzoate. On treatment of the latter with butanesulfonyl chloride in the presence of pyridine according to the manipulative procedure described above in Example 1, there can be obtained ethyl 3-butanesulfonamido-6-cyanobenzoate.

Example 29

*Methyl 2-butanesulfonamido-4-isopropylbenzoate* (II; R is CH$_3$(CH$_2$)$_3$, R' is H, R" is CH$_3$, n is 1, Q is 4-CH(CH$_3$)$_2$).—By reducing methyl 4-isopropyl-2-nitrobenzoate with hydrogen over a platinum catalyst according to the manipulative procedure described above in Example 9, and subsequent treatment of the methyl 2-amino-4-isopropylbenzoate produced with a molar equivalent amount of butanesulfonyl chloride and a molar excess of pyridine, theer can be obtained methyl 2-butanesulfonamido-4-isopropylbenzoate.

Example 30

*Ethyl 3,5-bis(methanesulfonamido)benzoate* (II; R is CH$_3$, R' is H, R" is C$_2$H$_5$, n is 2, Q is H) was prepared from 24 g. (0.1 mole) of ethyl 3,5-dinitrobenzoate in 125 ml. of ethyl acetate, 25.9 g. (0.22 mole) of methanesulfonyl chloride and 18 ml. of pyridine according to the manipulative procedure described above in Example 9. The crude product was recrystallized from 2-propanol giving 12 g. of ethyl 3,5-bis(methanesulfonamido)benzoate, M.P. 245.8–248.0° C. (corr.).

*Analysis.*—Calcd. for C$_{11}$H$_{16}$N$_2$O$_6$S$_2$: N, 8.34; S, 19.05. Found: N, 8.11; S, 18.90.

Example 31

*Ethyl 3,5-bis(butanesulfonamido)benzoate* (II; R is CH$_3$(CH$_2$)$_3$, R' is H, R" is C$_2$H$_5$, n is 2, Q is H) was prepared from 24.0 g. (0.1 mole) of ethyl 3,5-dinitrobenzoate in 125 ml. of ethyl acetate, 34.6 g. (0.22 mole) of butanesulfonyl chloride and 18 ml. of pyridine according to the manipulative procedure described above in Example 9. The crude product was recrystallized from ethanol giving 18 g. of ethyl 3,5-bis(butanesulfonamido) benzoate, M.P. 177.2–177.8° C. (corr.).

*Analysis.*—Calcd. for C$_{17}$H$_{28}$N$_2$O$_6$S$_2$: N, 6.67; S, 15.24; N.E., 420.5. Found: N, 6.54; S, 15.59; N.E., 407.

Example 32

*Ethyl 3-butanesulfonamido-5-methanesulfonamide benzoate* (II; R is CH$_3$ and CH$_3$(CH$_2$)$_3$, R' is H, n is 2, Q is H).—By reducing the ethyl 3-methanesulfonamido-5-nitrobenzoate obtained above in Example 6 with ammonium sulfide in an appropriate organic solvent, for example ethanol, there can be obtained ethyl 3-amino-5-methanesulfonamidobenzoate. On reaction of the latter with one molar equivalent amount of butanesulfonyl chloride in the presence of a molar excess of pyridine, there can be obtained ethyl 3-butanesulfonamido-5-methanesulfonamidobenzoate.

Example 33

*Ethyl 4-(N-methylbutanesulfonamido)benzoate* (II; R is CH$_3$(CH$_2$)$_3$, R' is CH$_3$, R" is C$_2$H$_5$, n is 1, Q is H).—Ethyl 4-butanesulfonamido benzoate (13.6 g., 0.05 mole) was dissolved in 200 ml. of an aqueous solution containing 2.0 g. (0.05 mole) of sodium hydroxide. To the solution was added 7.57 g. (0.06 mole) of methyl sulfate. The mixture was stirred for two and a half hours while adding additional amounts of dilute sodium hydroxide to maintain an alkaline medium. The supernatant liquid was then decanted from the gummy material that had separated, and the gum was washed once with water by decantation and then dissolved in ether. The ethereal solution was extracted with four 100 ml. portions of water. The ether layer was dried and the solvent distilled off leaving 12.2 g. of ethyl 4-(N-methylbutanesulfonamido)benzoate as a yellow-orange viscous liquid.

Example 34

*Ethyl 3-butanesulfonamido-5-(N - isobutylmethanesulfonamido)benzoate* (II; R is CH$_3$ and CH$_3$(CH$_2$)$_3$, R' is H and (CH$_3$)$_2$CHCH$_2$, R" is C$_2$H$_5$, n is 2, Q is H).—By reacting the ethyl 3-methanesulfonamido-5-nitrobenzoate obtained above in Example 6 with isobutylsulfate and sodium hydroxide according to the manipulative procedure described above in Example 33, there can be obtained ethyl 3-(N-isobutylmethanesulfonamido)-5-nitrobenzoate. By reducing the latter with ammonium sulfide in an appropriate organic solvent, for example ethanol, there can be obtained ethyl 3-amino-5-(N-isobutylmethanesulfonamido)benzoate. On reaction of the latter with one molar equivalent amount of butanesulfonyl chloride in the presence of a molar excess of pyridine, there can be obtained ethyl 3-butanesulfonamido-5-(N-isobutylmethanesulfonamido)benzoate.

Example 35

*Ethyl 3-butanesulfonamido - 6 - methoxy-5-methylbenzoate* (II; R is CH$_3$(CH$_2$)$_3$, R' is H, R" is C$_2$H$_5$, n is 1, Q is 5-CH$_3$, 6-CH$_3$O).—By reducing ethyl 2-methoxy-3-methyl-5-nitrobenzoate with hydrogen over a platinum catalyst according to the manipulative procedure described above in Example 9, there can be obtained ethyl 3-amino-6-methoxy-5-methylbenzoate. By reacting the latter with a molar equivalent amount of butanesulfonyl chloride in the presence of a molar excess of pyridine according to the manipulative procedure described above in Example 1, there can be obtained ethyl 3-butanesulfonamido-6-methoxy-5-methylbenzoate.

FINAL PRODUCTS

Example 36

*(2-methanesulfonamidobenzoyl)hydrazine* (I; R is CH$_3$, R' is H, n is 1, Y and Q are H).—Ethyl 2-methanesulfonamidobenzoate (17.5 g., 0.071 mole) was dissolved in 150 ml. of absolute ethanol and 20 ml. of hydrazine hydrate was added. The reaction mixture was refluxed for about forty hours and then concentrated on a steam bath to about one third of its volume. The reaction mixture was then cooled and acidified with acetic acid. On scratching and cooling, the product separated and was collected by filtration and recrystallized from ethanol to give 8.1 g. of (2-methanesulfonamidobenzoyl)hydrazine, M.P. 131.4–132.8° C. (corr.).

*Analysis.*—Calcd. for C$_8$H$_{11}$N$_3$O$_3$S: N.E., 229.2; N, 18.32. Found: N.E., 227.7; N, 18.80.

(2-methanesulfonamidobenzoyl)hydrazine was found to be bacteriostatic at a dilution of 1:10,000 when tested in vitro against *Staph. aureus* and *E. typhi*.

(2-methanesulfonamidobenzoyl)hydrazine can be reacted with hydrochloric acid, hydrobromic acid, hydriodic acid, nitric acid, sulfuric acid, phosphoric acid, acetic acid, citric acid, lactic acid, tartaric acid or quinic acid to give the hydrochloride, hydrobromide, hydriodide, nitrate, sulfate (or bisulfate), phosphate (or acid phosphate), acetate, citrate (or acid citrate), lactate, tartrate (or bitartrate) or quinate salts, respectively.

Example 37

*(2 - methanesulfonamido-4-nitrobenzoyl)hydrazine* (I; R is $CH_3$, R' is H, n is 1, Y is H, Q is 4-$NO_2$).—By reacting the ethyl 2-methanesulfonamido-4-nitrobenzoate obtained above in Example 2 with hydrazine hydrate according to the manipulative procedure described above in Example 36, there can be obtained (2-methanesulfonamido-4-nitrobenzoyl)-hydrazine.

Example 38

*(5-chloro-2-methanesulfonamidobenzoyl)hydrazine* (I; R is $CH_3$, R' is H, n is 1, Y is H, Q is 5-Cl).—By reacting the ethyl 5-chloro-2-methanesulfonamido-benzoate obtained above in Example 3 with hydrazine hydrate according to the manipulative procedure described above in Example 36, there can be obtained (5-chloro-2-methanesulfonamidobenzoyl)-hydrazine.

Example 39

*(2-butanesulfonamidobenzoyl)hydrazine* (I; R is $CH_3(CH_2)_3$
R' is H, n is 1, Y and Q are H) was prepared from 9.5 g. (0.033 mole) of ethyl 2-butanesulfonamidobenzoate and 30 ml. of hydrazine hydrate in 30 ml. of methanol according to the manipulative procedure described above in Example 36. The product was purified by reprecipitation from its solution in dilute alkali. There was thus obtained 8.0 g. of (2-butanesulfonamidobenzoyl) hydrazine, M.P. 106.3–107.9° C. (corr.).

*Analysis.*—Calcd. for $C_{11}H_{17}N_3O_3S$: N, 15.45; S, 11.81. Found: N, 15.31; S, 11.83.

(2-butanesulfonamidobenzoyl)hydrazine can be reacted with hydrochloric acid to give the hydrochloride salt.

Example 40

*(3-methanesulfonamidobenzoyl)hydrazine* (I; R is $CH_3$, R' is H, n is 1, Y and Q are H) was prepared from 20 g. (0.082 mole) of ethyl 3-methanesulfonamidobenzoate and 60 ml. of hydrazine hydrate in 60 ml. of methanol according to the manipulative procedure described above in Example 36. The product was recrystallized from an ethanol-methanol mixture giving 12 g. of (3-methanesulfonamidobenzoyl)hydrazine, M.P. 191.5–193.4° C. (corr.).

*Analysis.*—Calcd. for $C_8H_{11}N_3O_3S$: N, 18.32; S, 13.99. Found: N, 18.37; S, 14.17.

(3-methanesulfonamidobenzoyl)hydrazine can be reacted with hydrochloric acid to give the hydrochloride salt.

Example 41

*(3-methanesulfonamido-5-nitrobenzoyl)hydrazine* (I; R is $CH_3$, R' is H, n is 1, Y is H, Q is 5-$NO_2$) was prepared from 28.8 g. (0.1 mole) of ethyl 3-methanesulfonamido-5-nitrobenzoate and 20 g. of hydrazine hydrate in 200 ml. of absolute ethanol according to the manipulative procedure described above in Example 36. The product was recrystallized from boiling water to give 12 g. of (3 - methanesulfonamido-5-nitrobenzoyl)hydrazine, M.P. 249.8–250.5° C. (corr.).

*Analysis.*—Calcd. for $C_8H_{10}N_4O_5S$: $N_{NO_2}$, 5.10; N, 20.43. Found: $N_{NO_2}$, 5.38; N, 20.17.

(3-methansulfonamido-5-nitrobenzoyl)hydrazine can be reacted with hydrochloric acid to give the hydrochloride salt.

Example 42

*(3-amino-5-methanesulfonamidobenzoyl)hydrazine dihydrochloride* (I; R is $CH_3$, R' is H, n is 1, Y is H, Q is 3-$NH_2$).—Eighteen grams (0.065 mole) of (3-methanesulfonamido-5-nitrobenzoyl)hydrazine, obtained above in Example 40, were dissolved in 200 ml. of water and 10 ml. of hydrazine hydrate. About 0.2 gram of Raney nickel catalyst was added and the reaction mixture was warmed on a steam bath to about 35° C. Warming was continued until foaming stopped, and the reaction mixture was then filtered from the catalyst and the filtrate acidified with dilute acid. The filtrate was concentrated in vacuo to a volume of about 40 ml. On chilling, the product separated as a gray-pink solid. It was collected and recrystallized once from ethanol and then converted to the hydrochloride salt with concentrated hydrochloric acid. The salt was recrystallized from a 2-propanol-water mixture giving 3 g. of (3-amino-5-methanesulfonamidobenzoyl)hydrazine dihydrochloride, M.P. 241.1–243.2 C. (corr.).

*Analysis.*—Calcd. for $C_8H_{12}N_4O_3S \cdot 2HCl$: N, 17.65; Cl, 22.35. Found: N, 17.30; Cl, 22.15.

Example 43

*(3-butanesulfonamidobenzoyl)hydrazine* (I; R is $CH_3(CH_2)_3$
R' is H, n is 1, Y and Q are H) was prepared from 15 g. (0.053 mole) of ethyl 3-butanesulfonamidobenzoate and 45 ml. of hydrazine hydrate in 45 ml. of methanol according to the manipulative procedure described above in Example 36. The product was recrystallized from methanol giving 11.3 g. of (3-butanesulfonamidobenzoyl) hydrazine, M.P. 158.9–160.9° C. (corr.).

*Analysis.*—Calcd. for $C_{11}H_{17}N_3O_3S$: S, 11.81; N, 15.49. Found: S, 12.42; N, 15.42.

(3-butanesulfonamidobenzoyl)hydrazine can be reacted with hydrochloric acid to give the hydrochloride salt.

Example 44

*(3-butanesulfonamido-5-nitrobenzoyl)hydrazine* (I; R is $CH_3(CH_2)_3$, R' is H, n is 1, Y is H, Q is 5-$NO_2$).—By reacting the ethyl 3-butanesulfonamido-5-nitrobenzoate, obtained above in Example 8, with hydrazine hydrate according to the manipulative procedure described above in Example 36, there can be obtained (3-butanesulfonamindo-5-notrobenzoyl)hydrazine.

Example 45

*(5-amino-3-butanesulfonamidobenzoyl)hydrazine* (I; R is $CH_3(CH_2)_3$, R' is H, n is 1, Y is H, Q is 5-$NH_2$).—By reacting (3 - butanesulfonamido -5 - nitrobenzoyl)-hydrazine obtained above in Example 44 with hydrazine hydrate in the presence of Raney nickel catalyst according to the manipulative procedure described above in Example 42, there can be obtained (5-amino-3-butanesulfonamidobenzoyl)hydrazine.

Example 46

*(3-butanesulfonamido-5-hydroxybenzoyl)hydrazine* (I; R is $CH_3(CH_2)_3$, R' is H, n is 1, Y is H, Q is 5-HO) was prepared from 14 g. (0.041 mole) of ethyl 3-acetoxy-5-butanesulfonamidobenzoate and 25 ml. of hydrazine hydrate in 25 ml. of ethanol. The product was recrystallized from 2-propanol giving 4 g. of (3-butanesulfonamido-5-hydroxybenzoyl)hydrazine, M.P. 166.4–169.0° C. (corr.).

*Analysis.*—Calcd. for $C_{11}H_{17}N_3O_4S$: N, 14.62; S, 11.16. Found: N, 14.40; S, 11.23.

(3-butanesulfonamido-5-hydroxybenzoyl)hydrazine can be reacted with hydrochloric acid to give the hydrochloride salt.

Example 47

(5-butanesulfonamido-2-hydroxybenzoyl)hydrazine (I; R is $CH_3(CH_2)_3$, R' is H, $n$ is 1, Y is H, Q is 2-HO) was prepared from 17 g. (0.052 mole) of methyl 2-acetoxy-5-butanesulfonamidobenzoate and 35 ml. of hydrazine hydrate in 35 ml. of absolute ethanol according to the manipulative procedure described above in Example 36. The product was recrystallized from ethanol giving 8.0 g. of (5-butanesulfonamido-2-hydroxybenzoyl)hydrazine, M.P. 140.2–141.6° C. (corr.).

*Analysis.*—Calcd. for $C_{11}H_{17}N_3O_4S$: N, 14.62; S, 11.16. Found: N, 14.42; S, 11.24.

(5-butanesulfonamido-2-hydroxybenzoyl)hydrazine can be reacted with hydrochloric acid to give the hydrochloride salt.

(5 - butanesulfonamido - 2 - hydroxybenzoyl)hydrazine was found to be bacteriostatic at a dilution of 1:1,000 when tested in vitro against *Staph. aureus* and *E. typhi*. In amoebiasis studies in hamsters, it cleared two out of five animals of the organism, *Endamoeba criceti*, at a dose level of 100 mg./kg./day. Intravenous toxicity studies in mice have shown the $LD_{50}$ to be 170±10 mg./kg.

Example 48

(4-methanesulfonamidobenzoyl)hydrazine (I; R is $CH_3$, R' is H, $n$ is 1, Y and Q are H) was prepared from 20 g. (0.082 mole) of ethyl 4-methanesulfonamidobenzoate and 20 ml. of hydrazine hydrate in 150 ml. of ethanol according to the manipulative procedure described above in Example 36. The crude product was recrystallized twice from ethanol giving 7.5 g. of (4-methanesulfonamidobenzoyl)hydrazine, M.P. 230.7–233.9° C. (corr.).

*Analysis.*—Calcd. for $C_8H_{11}N_3O_3S$: N.E., 229; N, 18.32. Found: N.E., 234; N, 18.50.

(4-methanesulfonamidobenzoyl)hydrazine can be reacted with hydrochloric acid to give the hydrochloride salt.

Example 49

(4-ethanesulfonamidobenzoyl)hydrazine (I; R is $C_2H_5$, R' is H, $n$ is 1, Y and Q are H) was prepared from 18.5 g. (0.072 mole) of ethyl 4-ethanesulfonamidobenzoate and 25 ml. of hydrazine hydrate according to the manipulative procedure described above in Example 36. The product was recrystallized from 2-propanol giving 6 g. of (4 - ethanesulfonamidobenzoyl)hydrazine, M.P. 205.2–208.2° C. (corr.).

*Analysis.*—Calcd. for $C_9H_{13}N_3O_3S$: N, 17.28; S, 13.18. Found: N, 17.15; S, 12.78.

(4-ethanesulfonamidobenzoyl)hydrazine can be reacted with hydrochloric acid to give the hydrochloride salt.

(4-ethanesulfonamidobenzoyl)hydrazine was found to be bacteriostatic at a dilution of 1:1,000 when tested in vitro against *Staph. aureus* and *E. typhi*. In vivo studies in mice showed that a dose of 300 mg./kg./day was effective to cure eight mice out of a group of ten infected with *D. pneumoniae*. In amoebiasis studies in hamsters, it cleared one out of five animals of the organism, *Endamoeba criceti*, at a dose level of 100 mg./kg./day.

Example 50

(4 - propanesulfonamidobenzoyl)hydrazine (I; R is $CH_3(CH_2)_2$, R' is H, $n$ is 1, Y and Q are H) was prepared from 36 g. (0.132 mole) of ethyl 4-propanesulfonamidobenzoate and 40 ml. of hydrazine hydrate in 200 ml. of ethanol according to the manipulative procedure described above in Example 36. The product was recrystallized from dilute ethanol giving 11.8 g. of (4-propanesulfonamidobenzoyl)hydrazine, M.P. 195.2–196.6° C. (corr.).

*Analysis.*—Calcd. for $C_{10}H_{15}N_3O_3S$: S, 12.46; N, 16.33. Found: S, 12.31; N, 16.23.

(4-propanesulfonamidobenzoyl)hydrazine can be reacted with hydrochloric acid to give the hydrochloride salt.

(4-propanesulfonamidobenzoyl)hydrazine was found to be bacteriostatic at a dilution of 1:1,000 when tested in vitro against *Staph. aureus*. In vivo studies in mice showed that a dose of 450 mg./kg./day was effective to cure nine mice out of a group of ten infected with type I *D. pneumoniae*.

Example 51

[4-(2-propanesulfonamido)benzoyl]hydrazine (I; R is $(CH_3)_2CH$, R' is H, $n$ is 1, Y and Q are H) was prepared from 9.0 g. (0.033 mole) of ethyl 4-(2-propanesulfonamido)benzoate and a molar excess of hydrazine hydrate in ethanol according to the manipulative procedure described above in Example 36. The product was recrystallized from dilute methanol giving 7.4 g. of [4-(2-propanesulfonamido)benzoyl]hydrazine, M.P. 245.4–250.2° C. (corr.).

*Analysis.*—Calcd. for $C_{10}H_{15}N_3O_3S$: N, 16.33; S, 12.46. Found: N, 16.30; S, 12.39.

[4-(2-propanesulfonamido)benzoyl]hydrazine can be reacted with hydrochloric acid to give the hydrochloride salt.

In vivo studies in mice showed that a dose of 450 mg./kg./day was effective to cure all animals in a group of ten infected with type I *D. pneumoniae*.

Example 52

(4 - butanesulfonamidobenzoyl)hydrazine (I; R is $CH_3(CH_2)_3$, R' is H, $n$ is 1, Y and Q are H) was prepared from 15 g. (0.053 mole) of ethyl 4-butanesulfonamidobenzoate and 45 ml. of hydrazine hydrate in 45 ml. of methanol according to the manipulative procedure described above in Example 36. The product was recrystallized from methanol giving (4-butanesulfonamidobenzoyl)hydrazine, M.P. 189.7–191.0° C. (corr.).

*Analysis.*—Calcd. for $C_{11}H_{17}N_3O_3S$: N.E., 271; N, 15.49. Found: N.E., 273; N, 15.59.

(4-butanesulfonamidobenzoyl)hydrazine can be reacted with hydrochloric acid to give the hydrochloride salt.

(4-butanesulfonamidobenzoyl)hydrazine was found to be bacteriostatic at a dilution of 1:1,000 when tested in vitro against *Staph. aureua, E. typhi* and types I, II and III *D. pneumoniae*. In vivo studies in mice showed that a dose of 400 mg./kg./day was effective to cure all mice in a group of ten infected with type I *D. pneumoniae*. The oral $LD_{50}$ as revealed by toxicity studies in mice has been shown to be around 2000 mg./kg.

Example 53

(4-butanesulfonamido-2-chlorobenzoyl)hydrazine (I; R is $CH_3(CH_2)_3$, R' is H, $n$ is 1, Y is H, Q is 2-Cl) was prepared from 20 g. (0.066 mole) of methyl 4-butanesulfonamido-2-chlorobenzoate and 50 ml. of hydrazine hydrate in 50 ml. of methanol according to the manipulative procedure described above in Example 36. The product was recrystallized from ethanol giving 12.3 g. of (4-butanesulfonamido - 2 - chlorobenzoyl)hydrazine, M.P. 153.2–155.2° C. (corr.).

*Analysis.*—Calcd. for $C_{11}H_{16}ClN_3O_3S$: N, 13.74; S, 10.48. Found: N, 13.63; S, 10.53.

Example 54

(4-butanesulfonamido-2-hydroxybenzoyl)hydrazine (I; R is $CH_3(CH_2)_3$, R' is H, $n$ is 1, Y is H, Q is 2-HO) was prepared from 24 g. (0.07 mole) of ethyl 2-acetoxy-4-butanesulfonamidobenzoate and 60 ml. of hydrazine hydrate in 60 ml. of absolute ethanol according to the manipulative procedure described above in Example 36. The product was recrystallized from dimethylformamide giving 9.5 g. of (4-butanesulfonamido-2-hydroxybenzoyl)hydrazine, M.P. 257.0–258.4° C. (corr.).

*Analysis..*—Calcd. for $C_{11}H_{17}N_3O_4S$: N, 14.61; S, 11.15. Found: N, 14.89; S, 11.38.

(4-butanesulfonamido - 2 - hydroxybenzoyl)hydrazine can be reacted with hydrochloric acid to give the hydrochloride salt.

Example 55

(4 - butanesulfonamido - 2-methoxybenzoyl)hydrazine (I; R is $CH_3(CH_2)_3$, R' is H, $n$ is 1, Y is H, Q is 2-$CH_3O$) was prepared from 9.6 g. (0.032 mole) of ethyl 4-butanesulfonamido-2-methoxybenzoate and 40 ml. of hydrazine hydrate in 120 ml. of ethanol according to the manipulative procedure described above in Example 36. The product was recrystallized from ethanol giving 5.5 g. of (4-butanesulfonamido-2-methoxybenzoyl)hydrazine, M.P. 230.0–232.6° C. (corr.).

*Analysis.*—Calcd. for $C_{12}H_{19}N_3O_4S$: N, 13.94; S, 10.63. Found: N, 14.08; S, 10.56.

(4 - butanesulfonamido - 2-methoxybenzoyl)hydrazine can be reacted with hydrochloric acid to give the hydrochloride salt.

Example 56

(4 - butanesulfonamido - 3-hydroxybenzoyl)hydrazine (I; R is $CH_3(CH_2)_3$, R' is H, $n$ is 1, Y is H, Q is 3-HO) was prepared from 10 g. (0.035 mole) of methyl 4-butanesulfonamido-3-hydroxybenzoate and 20 ml. of hydrazine hydrate in 20 ml. of ethanol according to the manipulative procedure described above in Example 36. The product was recrystallized from methanol giving 6.2 g. of (4-butanesulfonamido - 3-hydroxybenzoyl)hydrazine, M.P. 222.6–224.0° C. (corr.).

*Analysis.*—Calcd. for $C_{11}H_{17}N_3O_4S$: N, 14.62; S, 11.16. Found: N, 14.90; S, 10.93.

(4 - butanesulfonamido - 3-hydroxybenzoyl)hydrazine can be reacted with hydrochloric acid to give the hydrochloride salt.

(4 - butanesulfonamido - 3-hydroxybenzoyl)hydrazine was found to be bacteriostatic at a dilution of 1:1,000 when tested in vitro against *Staph. aureus, E. typhi, Pseud. aeruginosa* and *Cl. welchii*. It was bactericidal against H37Rv strain *Myco. tuberculosis* at a dilution of 1:13,000.

Example 57

(4 - pentanesulfonamidobenzoyl)hydrazine (I; R is $CH_3(CH_2)_4$, R' is H, $n$ is 1, Y and Q are H) was prepared from 21.3 g. (0.0712 mole) of ethyl 4-pentanesulfonamidobenzoate and 55 ml. (1.1 mole) of hydrazine hydrate in 200 ml. of ethanol according to the manipulative procedure described above in Example 36. The product was recrystallized from dilute methanol giving 5.8 g. of (4-pentanesulfonamidobenzoyl)hydrazine, M.P. 191.4–192.6° C. (corr.).

(4-pentanesulfonamidobenzoyl)hydrazine can be reacted with hydrochloric acid to give the hydrochloride salt.

(4-pentanesulfonamidobenzoyl)hydrazine was found to be bacteriostatic at a dilution of 1:1,000 when tested in vitro against *Staph. aureus* and *E. typhi*. In vivo studies in mice showed that a dose of 400 mg./kg./day was effective to cure all mice in a group of ten infected with *D. pneumoniae*. Against type I *D. pneumoniae* there were eight survivors out of a group of ten when medicated at a dose level of 450 mg./kg./day of the compound.

Example 58

(4 - hexanesulfonamidobenzoyl)hydrazine (I; R is $CH_3(CH_2)_5$, R' is H, $n$ is 1, Y and Q are H) was prepared from 12.4 g. (0.04 mole) of ethyl 4-hexanesulfonamidobenzoate and 35 ml. of hydrazine hydrate in 75 ml. of ethanol according to the manipulative procedure described above in Example 36. The product was recrystallized from methanol giving 8.8 g. of (4-hexanesulfonamidobenzoyl)-hydrazine, M.P. 186.4–188.8° C. (corr.).

*Analysis.*—Calcd. for $C_{13}H_{21}N_3O_3S$: N, 14.03; S, 10.70. Found: N, 13.93; S, 11.00.

(4-hexanesulfonamidobenzoyl)hydrazine can be reacted with hydrochloric acid to give the hydrochloride salt.

(4-hexanesulfonamidobenzoyl)hydrazine was found to be bacteriostatic at a dilution of 1:10,000 when tested in vitro against *Staph. aureus* and *E. typhi*.

Example 59

4 - (heptanesulfonamidobenzoyl)hydrazine (I; R is $CH_3(CH_2)_6$, R' is H, $n$ is 1, Y and Q are H) was prepared from 24.7 g. (0.075 mole) of ethyl 4-heptanesulfonamidobenzoate according to the manipulative procedure described above in Example 36. The product was recrystallized from methanol giving 13.4 g. of (4-heptanesulfonamidobenzoyl)hydrazine, M.P. 191.0–193.6° C. (corr.).

*Analysis.*—Calcd. for $C_{14}H_{23}N_3O_3S$: N, 13.41; S, 10.23. Found: N, 13.33; S, 9.86.

(4-heptanesulfonamidobenzoyl)hydrazine can be reacted wtih hydrochloric acid to give the hydrochloride salt.

(4-heptanesulfonamidobenzoyl)hydrazine was found to be bacteriostatic at a dilution of 1:10,000 when tested in vitro against *Staph. aureus* and *E. typhi*.

Example 60

(4 - decanesulfonamidobenzoyl)hydrazine (I; R is $CH_3(CH_2)_9$, R' is H, $n$ is 1, Y and Q are H) was prepared from 6.7 g. (0.018 mole) of ethyl 4-decanesulfonamidobenzoate and a molar excess of hydrazine hydrate according to the manipulative procedure described above in Example 36. The product was recrystallized from methanol giving 5.2 g. of (4-decanesulfonamidobenzoyl)hydrazine, M.P. 186.8–188.8° C. (corr.).

*Analysis.*—Calcd. for $C_{17}H_{29}N_3O_3S$: N, 11.82; S, 9.02. Found: N, 11.60; S, 8.77.

(4-decanesulfonamidobenozyl)hydrazine can be reacted with hydrochloric acid to give the hydrochloride salt.

Example 61

(4 - acetyl - 2 - butanesulfonamidobenzoyl)hydrazine (I; R is $CH_3(CH_2)_3$, R' is H, $n$ is 1, Y is H, Q is 4-$CH_3CO$).—By reacting methyl 4-acetyl-2-butanesulfonamidobenzoate obtained above in Example 24 with a molar excess of hydrazine hydrate in an appropriate organic solvent, for example methanol, according to the manipulative procedure described above in Example 36, there can be obtained (4-acetyl-2-butanesulfonamidobenzoyl)hydrazine.

Example 62

(3 - butanesulfonamido - 6 - methylmercaptobenzoyl)-hydrazine (I; R is $CH_3(CH_2)_3$, R' is H, $n$ is 1, Y is H, Q is 6-$CH_3S$).—By reacting the ethyl 3-butanesulfonamido-6-methylmercaptobenzoate prepared above in Example 25 with a molar excess of hydrazine hydrate according to the manipulative procedure described above in Example 36, there can be obtained (3-butanesulfonamido-6-methylmercaptobenzoyl)hydrazine.

Example 63

(3 - butanesulfonamido - 6 - methylsulfinylbenzoyl)hydrazine (I; R is $CH_3(CH_2)_3$, R' is H, $n$ is 1, Y is H, Q is 6-$CH_3SO$).—By reacting the ethyl 3-butanesulfonamido-6-methylsulfinylbenzoate prepared above in Example 26 with a molar excess of hydrazine hydrate according to the manipulative procedure described above in Example 36, there can be obtained (3-butanesulfonamido-6-methylsulfinylbenzoyl)hydrazine.

Example 64

(3 - butanesulfonamido - 6 - methylsulfonylbenzoyl)hydrazine (I; R is $CH_3(CH_2)_3$, R' is H, $n$ is 1, Y is H, Q is 6-$CH_3SO_2$).—By reacting the ethyl 3-butanesulfonamido-6-methylsulfonylbenzoate obtained above in Example 27 with a molar excess of hydrazine hydrate according to the manipulative procedure described above in Example 36, there can be obtained (3-butanesulfonamido-6-methylsulfonylbenzoyl)hydrazine.

Example 65

(3 - butanesulfonamido - 6 - cyanobenzoyl)hydrazine (I; R is $CH_3(CH_2)_3$, R' is H, $n$ is 1, Y is H, Q is 6-CN).—

By reacting the ethyl 3-butanesulfonamido-6-cyanobenzoate obtained above in Example 28 with a molar excess of hydrazine hydrate according to the manipulative procedure described above in Example 36, there can be obtained 3-butanesulfonamido-6-cyanobenzoyl)hydrazine.

*Example 66*

(2 - butanesulfonamido - 4 - isopropylbenzoyl)hydrazine [I; R is $CH_3(CH_2)_3$, R' is H, n is 1, Y is H, Q is 4-$CH(CH_3)_2$].—By reacting the methyl 2-butanesulfonamido-4-isopropylbenzoate prepared above in Example 29 with a molar excess of hydrazine hydrate according to the manipulative procedure described above in Example 36, there can be obtained (2-butanesulfonamide-4-isopropylbenzoyl)hydrazine.

*Example 67*

[3,5-bis(methanesulfonamido)benzoyl]hydrazine (I; R is $CH_3$, R' is H, n is 2, Y and Q are H) was prepared from 45 g. (0.13 mole) of ethyl 3,5-bis(methanesulfonamido)benzoate and 100 ml. of hydrazine hydrate in 100 ml. of methanol according to the manipulative procedure described above in Example 36. The product was recrystallized from a dimethylformamide-ethanol mixture giving 19 g. of [3,5-bis(methanesulfonamido)benzoyl]hydrazine, M.P. 254.8–258.4° C. (corr.).

*Analysis.*—Calcd. for $C_9H_{14}N_4O_5S_2$: N, 17.38; S, 19.89. Found: N, 17.47; S, 19.32.

[3,5-bis(methanesulfonamido)benzoyl]hydrazine can be reacted with hydrochloric acid to give the hydrochloride salt.

*Example 68*

[3,5-bis(butanesulfonamido)benzoyl]hydrazine (I; R is $CH_3(CH_2)_3$, R' is H, n is 2, Y and Q are H) was prepared from 29 g. (0.07 mole) of ethyl 3,5-bis(butanesulfonamido)benzoate and 55 ml. of hydrazine hydrate in 50 ml. of ethanol according to the manipulative procedure described above in Example 36. The product was recrystallized from ethanol giving 16 g. of [3,5-bis(butanesulfonamido)benzoyl]hydrazine, M.P. 231.0–235.4° C. (corr.).

*Analysis.*—Calcd. for $C_{15}H_{26}N_4O_5S_2$: N, 13.78; S, 15.78. Found: N, 13.67; S, 15.75.

[3,5-bis(butanesulfonamido)benzoyl]hydrazine can be reacted with hydrochloric acid to give the hydrochloride salt.

*Example 69*

(3 - butanesulfonamido - 5 - methanesulfonamidobenzoyl)hydrazine (I; R is $CH_3$ and $CH_3(CH_2)_3$, R' is H, n is 2, Y and Q are H).—By reacting the ethyl 3-butanesulfonamido - 5 - methanesulfonamidobenzoate prepared above in Example 32 with a molar excess of hydrazine hydrate according to the manipulative procedure described above in Example 36, there can be obtained (3-butanesulfonamido-5-methanesulfonamidobenzoyl)hydrazine.

*Example 70*

[4 - (N - methylbutanesulfonamido)benzoyl]hydrazine (I; R is $CH_3(CH_2)_3$, R' is $CH_3$, n is 1, Y and Q are H) was prepared from 12.2 g. (0.043 mole) of ethyl 4-(N-methylbutanesulfonamido)benzoate and 25 ml. of hydrazine hydrate in 100 ml. of ethanol according to the manipulative procedure described above in Example 36. The product was recrystallized from dilute methanol giving 2.6 g. of [4-(N-methylbutanesulfonamido)benzoyl]hydrazine.

*Analysis.*—Calcd. for $C_{12}H_{19}N_3O_3S$: S, 11.23; N, 14.72. Found: S, 11.20; N, 14.50.

[4 - (N - methylbutanesulfonamido)benzoyl]hydrazine can be reacted with hydrochloric acid to give the hydrochloride salt.

In vivo studies in mice showed that a dose of 300 mg./kg./day of [4-(N-methylbutanesulfonamido)benzoyl]hydrazine was effective to cure seven mice out of a group of ten infected with D. pneumoniae, and a dose of 225 mg./kg./day was effective to cure five mice out of a group of ten infected with type I D. pneumoniae. In amoebiasis studies in hamsters, it cleared all animals in a group of three of the organism, Endamoeba criceti, at a dose level of 100 mg./kg./day.

*Example 71*

[3 - butanesulfonamido - 5 - (N - isobutylmethanesulfonamido)benzoyl]-hydraine (I; R is $CH_3$ and $$CH_3(CH_2)_3$$

R' is H and $(CH_3)_2CHCH_2$, n is 2, Y and Q are H).—By reacting the ethyl 3-butanesulfonamido-5-(N-isobutylmethanesulfonamido)benzoate obtained above in Example 34 with a molar excess of hydrazine hydrate according to the manipulative procedure described above in Example 36, there can be obtained [3-butanesulfonamido-5-(N-isobutylmethanesulfonamido)benzoyl]hydrazine.

[3 - butanesulfonamido - 5 - (N - isobutylmethanesulfonamido)-benzoyl]hydrazine can be reacted with hydrochloric acid, hydrobromic acid, hydriodic acid, nitric acid, sulfuric acid, phosphoric acid, acetic acid, citric acid, lactic acid, tartaric acid, or quinic acid to give the hydrochloride, hydrobromide, hydriodide, nitrate, sulfate (or bisulfate), phosphate (or acid phosphate), acetate, citrate (or acid citrate), lactate, tartrate (or bitartrate) or quinate salts, respectively.

*Example 72*

(3 - butanesulfonamido - 6 - methoxy-5-methylbenzoyl)-hydrazine (I; R is $CH_3(CH_2)_3$, R' is H, n is 1, Y is H, Q is 5-$CH_3$, 6-$CH_3O$).—By reacting the ethyl 3-butanesulfonamido-6-methoxy-5-methylbenzoate obtained above in Example 35 with a molar excess of hydrazine hydrate according to the manipulative procedure described above in Example 36, there can be obtained (3-butanesulfonamido-6-methoxy-5-methylbenzoyl)hydrazine.

*Example 73*

1-acetyl-2-(4-butanesulfonamidobenzoyl)hydrazine (I; R is $CH_3(CH_2)_3$, R' is H, n is 1, Y is $CH_3CO$, Q is H).—A mixture of (4-butanesulfonamidobenzoyl)hydrazine (13.6 g., 0.05 mole) and 50 ml. of acetic anhydride was heated briefly on a steam bath until all the solid had dissolved. The reaction mixture was allowed to stand at room temperature for about 15 hours, and the precipitated solid which had separated was then collected by filtration and washed thoroughly with petroleum ether (Skelly B). There was thus obtained 13.1 g. of 1-acetyl-2-(4-butanesulfonamidobenzoyl)hydrazine, M.P. 145.6–146.6° C. (corr.).

*Analysis.*—Calcd. for $C_{13}H_{19}N_3O_4S$: N, 13.41; S, 10.23. Found: N, 13.05; S, 10.50.

In vivo studies in mice showed that a dose of 450 mg./kg./day of 1-acetyl-2-(4-butanesulfonamidobenzoyl)hydrazine was effective to cure five mice out of a group of ten infected with type I D. pneumoniae. Intravenous toxicity studies in mice have shown the $ALD_{50}$ to be 1000 mg./kg.

*Example 74*

1-dichloroacetyl-2-(4-butanesulfonamidobenzoyl)hydrazine (I; R is $CH_3(CH_2)_3$, R' is H, n is 1, Y is $Cl_2CHCO$, Q is H).—Ten grams (0.037 mole) of (4-butanesulfonamidobenzoyl)hydrazine were dissolved in 35 ml. of dimethylformamide. To the solution was added 6.0 g. of (0.041 mole) of dichloroacetyl chloride. The reaction mixture, which had warmed to 76° C., was cooled briefly to room temperature and then heated on a steam bath for five hours. The reaction mixture was poured onto crushed ice with stirring, and the sticky mass which separated solidified on scratching. The solid was collected by filtration and recrystallized from dilute dimethylformamide giving 8.5 g. of 1-dichloroacetyl-2-(4-butanesulfonamidobenzoyl)hydrazine, M.P. 198.4–202.6° C. (corr.).

*Analysis.*—Calcd. for $C_{13}H_{17}Cl_2N_3O_4S$: Cl, 18.55; N, 10.99. Found: Cl, 18.37; N, 11.04.

The oral ALD$_{50}$ of 1-dichloroacetyl-2-(4-butanesulfonamidobenzoyl)hydrazine as determined by toxicity studies in mice has been shown to be greater than 2000 mg./kg.

*Example 75*

*1-aminoacetyl-2-(4 - butanesulfonamidobenzoyl)hydrazine hydrobromide* (I; R is $CH_3(CH_2)_3$, R' is H, n is 1, Y is $NH_2CH_2CO$, Q is H).—A solution of 21 g. (0.1 mole) of carbobenzoxyglycine in 14 ml. of triethylamine was cooled with stirring to −10 to −20° C. To the stirred solution was added a solution of 14 ml. of isobutyl chlorocarbonate in 25 ml. of acetone over a ten minute period. (4-butanesulfonamidobenzoyl)hydrazine (23.5 g., 0.087 mole) was added all at once. The reaction mixture was stirred two hours at room temperature and then allowed to stand for about fifteen hours. To the reaction mixture was added 600 ml. of hot water with stirring. The solid which had separated was collected, washed with water and recrystallized from methanol giving 20 g. of 1-carbobenzoxyaminoacetyl-2-(4-butanesulfonamidobenzoyl)hydrazine, M.P. 234–236° C. (corr.).

*Analysis.*—Calcd. for $C_{13}H_{20}N_4O_4S$: N, 12.12. Found: N, 11.76.

A sample of the above product (19.5 g.) was treated with 70 ml. of 30% hydrobromic acid in glacial acetic acid. The reaction mass was diluted with ether and the solid collected by filtration. The product was recrystallized from methanol giving 13 g. of 1-aminoacetyl-2-(4-butanesulfonamidobenzoyl)hydrazine hydrobromide, M.P. 274.0–275.2° C. (corr.).

*Analysis.*—Calcd. for $C_{13}H_{20}N_4O_4S \cdot HBR$: Br, 19.53; N, 13.69. Found: Br, 19.27; N, 13.75.

In vivo studies in mice showed that a dose of 400 mg./kg./day of 1-aminoacetyl-2-(4-butanesulfonamidobenzoyl)hydrazine hydrobromide was effective to cure nine mice out of a group of ten infected with *D. pneumoniae*. In amoebiasis studies in hamsters, it cleared two out of five animals of the organism, *Endamoeba criceti*, at a dose level of 100 mg./kg./day.

1-aminoacetyl-2-(4-butanesulfonamidobenzoyl)hydrazine can be reacted with hydrochloric acid, hydriodic acid, nitric acid, sulfuric acid, phosphoric acid, acetic acid, citric acid, lactic acid, tartaric acid, or quinic acid to give the hydrochloride, hydriodide, nitrate, sulfate (or bisulfate), phosphate (or acid phosphate), acetate, citrate (or acid citrate), lactate, tartrate (or bitartrate) or quinate salts, respectively.

*Example 76*

*1-acetyl-2-(3-acetoxy-5-butanesulfonamidobenzoyl)hydrazine* (I; R is $CH_3(CH_2)_3$, n is 1, Y is $CH_3CO$, Q is $3\text{-}CH_3COO$).—By reacting the (3-butanesulfonamido-5-hydroxybenzoyl)hydrazine obtained above in Example 46 with 2 molar equivalents of acetic anhydride and then adding a small amount of sodium acetate as a catalyst, there can be obtained 1-acetyl-2-(3-acetoxy-5-butanesulfonamidobenzoyl)hydrazine.

*Example 77*

*1-α-chloroacetyl-2-(3-α-chloroacetylamino-5-methanesulfonamidobenzoyl)hydrazine* (I; R is $CH_3$, R' is H, n is 1, Y is $ClCH_2CO$, Q is $3\text{-}ClCH_2CONH$).—By reacting (3-amino-5-methanesulfonamidobenzoyl)hydrazine obtained above in Example 42 with 2 molar equivalents of chloroacetyl chloride in the presence of an acid-acceptor, for example pyridine, there can be obtained 1-α-chloroacetyl-2-(3-α-chloroacetylamino-5-methanesulfonamidobenzoyl)hydrazine.

*Example 78*

*1-acetyl-2-(3-amino-5-methanesulfonamidobenzoyl)hydrazine* (I; R is $CH_3$, R' is H, n is 1, Y is $CH_3CO$, Q is $3\text{-}NH_2$).—By reacting the (3-methanesulfonamido-5-nitrobenzoyl)-hydrazine prepared above in Example 41 with acetic anhydride according to the manipulative procedure described above in Example 73, there can be obtained 1-acetyl-2-(3-methanesulfonamido-5-nitrobenzoyl)-hydrazine. By reducing the latter with ammonium sulfide in an appropriate organic solvent, for example ethanol, there can be obtained 1-acetyl-2-(3-amino-5-methanesulfonamidobenzoyl)hydrazine.

1 - acetyl - 2 - (3-amino-5-methanesulfonamidobenzoyl)hydrazine can be reacted with hydrochloric acid, hydrobromic acid, hydriodic acid, nitric acid, sulfuric acid, phosphoric acid, acetic acid, citric acid, lactic acid, tartaric acid or quinic acid to give the hydrochloride, hydrobromide, hydriodide, nitrate, sulfate (or bisulfate), phosphate (or acid phosphate), acetate, citrate (or acid citrate), lactate, tartrate (or bitartrate) or quinate salts, respectively.

This application is a division of my prior, co-pending application Serial No. 806,235, filed April 14, 1959.

I claim:

1. A compound having the formula

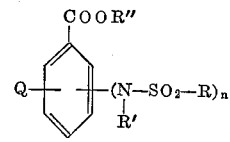

where n is an integer from one to two, R is alkyl having from one to twenty carbon atoms, R' is a member of the group consisting of hydrogen and lower-alkyl, R" is lower-alkyl, and Q is a member of the group consisting of hydrogen and from one to two radicals selected from the group consisting of: lower-alkyl; halogen; hydroxy; lower-alkoxy; nitro; amino; cyano; lower-alkylmercapto; lower-alkylsulfinyl; lower-alkylsulfonyl; lower-alkanoylamino; lower-alkanoylamino substituted on the α-carbon atom by a member of the group consisting of halogen and cyano; lower-alkanoyl; lower-alkanoyl substituted on the α-carbon atom by a member of the group consisting of halogen and cyano; lower-alkanoyloxy; and lower-alkanoyloxy substituted on the α-carbon atom by a member of the group consisting of halogen and cyano.

2. Lower-alkyl alkanesulfonamidobenzoate ester having from one to twenty carbon atoms in the alkane moiety.

3. Lower-alkyl bis(alkanesulfonamido)benzoate ester having from one to twenty carbon atoms in each alkane moiety.

4. Lower-alkyl (N-lower-alkyl - alkanesulfonamido)-benzoate ester having from one to twenty carbon atoms in the alkane moiety.

No references cited.

UNITED STATES PATENT OFFICE
CERTIFICATE OF CORRECTION

Patent No. 3,067,237                                         December 4, 1962

Aubrey A. Larsen

It is hereby certified that error appears in the above numbered patent requiring correction and that the said Letters Patent should read as corrected below.

Column 8, line 42, for "R" is $CH_2H_5$" read -- R" is $C_2H_5$ --; Column 9, line 21, for "acetonitriie" read -- acetonitrile --; line 41, for "theer" read -- there --; column 10, line 61, for "R is$CH_3$" read -- R is $CH_3$ --; column 12, line 25, for "243.2 C." read -- 243.2° C. --; lines 50 and 51, for "(3-butanesulfonamindo-5-notrobenzoyl)hydrazine" read -- (3-butanesulfonamido-5-nitrobenzoyl)hydrazine --; same column 12, line 55, after "reacting" insert -- the --; column 13, line 62, for "R." read -- R --; column 17, line 5, for "3-butanesulfonamido-" read -- (3-butanesulfonamido- --; line 66, for "$C_{12}H_{19}N_{30}O_3S$" read -- $C_{12}H_{19}N_3O_3S$ --; column 18, line 8, for "benzoyl]-hydraine", in italics, read -- benzoyl]-hydrazine --, in italics.

Signed and sealed this 17th day of December 1963.

(SEAL)
Attest:
ERNEST W. SWIDER

Attesting Officer

EDWIN L. REYNOLDS
Acting Commissioner of Patents